United States Patent [19]

Clash

[11] 4,209,577

[45] Jun. 24, 1980

[54] ALKALINE-MNO$_2$ CELL HAVING A ZINC POWDER-GEL ANODE CONTAINING METHYL CELLULOSE

[75] Inventor: David G. Clash, Fairview Park, Ohio

[73] Assignee: Union Carbide Corporation, New York, N.Y.

[21] Appl. No.: 892,313

[22] Filed: Mar. 31, 1978

[51] Int. Cl.$^2$ .......................................... H01M 6/06
[52] U.S. Cl. ................................. 429/206; 429/216; 429/224; 429/229
[58] Field of Search ............... 429/216, 215, 212, 206, 429/229-231, 224, 190

[56] References Cited

U.S. PATENT DOCUMENTS

| | | | |
|---|---|---|---|
| 2,606,941 | 8/1952 | Ruben | 429/174 |
| 2,866,840 | 12/1958 | Dittmann et al. | 429/215 |
| 2,935,547 | 5/1960 | Kordesch | 429/29 |
| 2,938,064 | 5/1960 | Kordesch | 429/27 |
| 2,960,558 | 11/1960 | Marsal et al. | 429/63 |
| 2,993,947 | 7/1961 | Leger | 429/166 |
| 3,288,642 | 11/1966 | Kordesch | 429/56 |
| 3,335,031 | 8/1967 | Kordesch | 429/133 |
| 3,451,851 | 6/1969 | Stanimirovitch | 429/216 |

*Primary Examiner*—Anthony Skapars
*Attorney, Agent, or Firm*—Cornelius F. O'Brien

[57] ABSTRACT

An alkaline-MnO$_2$ cell employing a zinc powder-gel anode in which the gelling agent is methyl cellulose with or without carboxymethyl cellulose.

8 Claims, No Drawings ated into an alkaline-MnO
ALKALINE-MNO$_2$ CELL HAVING A ZINC POWDER-GEL ANODE CONTAINING METHYL CELLULOSE

FIELD OF THE INVENTION

The invention relates to zinc powder-gel anodes for alkaline-MnO$_2$ cells and specifically to such anodes wherein the gelling agent is methyl cellulose (MOC) with or without carboxymethyl cellulose (CMC).

BACKGROUND OF THE INVENTION

A conventional type of alkaline cell employs a cathode comprising predominantly an oxidic depolarizer such as manganese dioxide usually admixed with a binder and conductive material such as graphite, steel wool and the like. The anode usually comprises a consumable anodic material such as powder zinc admixed with a gelling agent such as carboxymethyl cellulose, a suitable alkaline electrolyte such as an aqueous potassium hydroxide solution, and, if desired, mercury. The gel anode is then extruded to form a desired shaped electrode. Anode materials and their preparation are described in U.S. Pat. Nos. 2,938,064 and 2,935,547 issued to K. Kordesch and U.S. Pat. No. 2,993,947 issued to E. E. Leger. The above electrodes together with conventional separator material can be assembled into an alkaline-MnO$_2$/zinc cell.

Discharging the above described cell on a microampere drain or on very intermittent discharge has resulted in zinc oxide formation in the separator which can result in internal shorts. Specifically, zinc oxide in contact with metallic zinc is known to be conductive and thus an internal electronic path is formed between the anode and cathode. An investigation of the internal shorting problem has revealed the carboxymethyl cellulose to be a major contributor to the transporting and precipitating of the zinc oxide throughout the cell. This internal shorting causes wasteful consumption of the components of the cell resulting in lower output capacity.

It is an object of the present invention to provide an alkaline-MnO$_2$/zinc cell that can be discharged on microampere drains without internally shorting.

It is another object of the present invention to provide a powder-gel anode for alkaline-MnO$_2$ cells that employs methyl cellulose with or without carboxymethyl cellulose as the gelling agent.

It is another object of the present invention to provide a powder-gel anode comprising powder zinc, methyl cellulose with or without carboxymethyl cellulose and an aqueous alkaline electrolyte.

It is another object of the present invention to employ methyl cellulose as a gelling agent and lubricating agent for powder-gel anodes.

The foregoing and additional objects will become more fully apparent from the following description.

SUMMARY OF THE INVENTION

The invention broadly relates to powder-gel anodes comprising a major portion of a consumable anode material such as zinc, a minor amount of a gelling agent such as methyl cellulose with or without carboxymethyl cellulose and an aqueous alkaline electrolyte such as an aqueous potassium hydroxide solution.

The powder-gel anode of this invention is ideally suited for alkaline-MnO$_2$ cells. The amount of methyl cellulose (MOC), commercially available as Methocel, should range between about 1 and about 6 percent based on the total weight of the extruded anode prior to its assembly in a cell. An amount lower than 1 percent would not provide sufficient binding for the anode while an amount above 6 percent would replace too much of the active consumable anode material for a given size anode and render the gel too viscous to properly extrude the anode without providing any additional advantage. Preferably the range should be about 2 percent to about 5 percent based on the weight of the extruded anode.

Methyl cellulose has been found to have no ionic charge and therefore will not form complexes with metallic salts. Contrary to this, carboxymethyl cellulose (CMC), a carboxylic acid, does have an ionic charge and further can be oxidized by the action of manganese dioxide to produce more carboxylic acid groups. It is believed that if a complex between carboxymethyl cellulose and zinc oxide is formed, it also must have an association constant such that a minimum amount of carboxymethyl cellulose and zinc oxide must be in solution so that the product of their concentration exceeds that of the association constant before the solid complex will precipitate. Consequently by reducing the potassium hydroxide concentration, the solubility of zinc oxide is reduced thereby reducing the ionic product to a value close to or below the association constant which can prevent the carboxymethyl cellulose complex from transporting and precipitating the zinc oxide throughout the cell. The same effect is believed true if the carboxymethyl cellulose concentration is reduced. Thus by reducing either the zinc oxide or carboxymethyl cellulose in solution, the complex of these two compounds can be reduced thus resulting in less zinc oxide transported throughout the cell.

One advantage in the use of carboxymethyl cellulose is that it will cause the anode to swell on contact with the cell electrolyte thereby providing a good anode-to-cathode interface for optimum cell service. In an extruded anode containing methyl cellulose, methyl cellulose was observed to quickly precipitate on contact with the cell electrolyte without allowing the anode to effectively swell. Although the anode can be appropriately formed and positioned to make good contact against the separator/cathode of the cell before the electrolyte is added, it is within the scope of this invention to use a reduced amount of carboxymethyl cellulose along with methyl cellulose in the formation of powder-gel anodes. Thus the advantage of the swelling characteristics obtained through the use of carboxymethyl cellulose can be utilized without the disadvantage of internal shorting since the amount of carboxymethyl cellulose to be used can be greatly reduced from the amount that would normally be employed. For example, normally carboxymethyl cellulose is employed in an amount of about 3.5 to 5 percent based on the weight of the anode while the amount which can be used along with methyl cellulose in accordance with this invention is only about 0.5 to 2.5 percent based on the weight of the anode.

Preferably the methyl cellulose can vary between about 1 and about 4.5 percent and the carboxymethyl cellulose can vary between about 0.5 and about 2.5 percent based on the weight of the extruded anode. Most preferably, the methyl cellulose should be about 2 percent and the carboxymethyl cellulose about 1.5 percent based on the weight of the anode.

In addition to being a good substitute for carboxymethyl cellulose in powder-gel anodes, methyl cellulose upon precipitating will release or free electrolyte to the cell where it can be used in the electrochemical reaction and/or to improve ionic diffusion in the cell.

EXAMPLE 1

Several test lots of alkaline-MnO2/zinc cells (0.6 ampere-hour capacity) were constructed using electrodes formed from the following mixes:

cathode:
1.69 g manganese dioxide
0.16 g graphite
0.03 g acetylene black
0.23 g KOH (37%)
anode:
0.74 g powdered zinc (about 60 Tyler Mesh size)
0.088 g 0.1 N KOH
0.044 g mercury
a gelling agent as shown in Table 1.

The above components along with a separator of a fibrous cellulosic material were assembled in a conductive housing and then discharged across various loads, and the times it took to reach various cutoff voltages were observed. The data so obtained are shown in Tables 1 and 2. Cells from the test lots were stored at 54° C. or 71° C. for various time periods and then the open circuit voltage and current were observed. The data so obtained are shown in Table 3.

As evident from the data shown in the tables, methyl cellulose can effectively be used as a substitute for carboxymethyl cellulose so as to eliminate internal shorting on low drain conditions.

TABLE I

| Resistor Load (ohms) | 1.0 volt cutoff Test Lot No. | | | 0.9 volt cutoff Test Lot No. | | | 0.7 volt cutoff Test Lot No. | | |
|---|---|---|---|---|---|---|---|---|---|
| | 1 | 2 | 3 | 1 | 2 | 3 | 1 | 2 | 3 |
| 12.5[1] | 2.7 | 2.5 | 2.4 | 3.1 | 3.1 | 2.6 | 3.0 | 3.5 | 2.7 |
| 25[1] | 6.6 | 6.5 | 6.8 | 7.4 | 7.4 | 7.8 | 9.0 | 9.7 | 9.6 |
| 37.5[1] | 9.4 | 10.5 | 10.6 | 10.2 | 12.2 | 12.0 | 10.5 | 15.5 | 14.4 |
| 25[2] | 6.5 | 6.5 | 6.7 | 7.6 | 7.8 | 7.9 | 8.8 | 9.5 | 9.3 |
| 83.3[3] | 24 | 25 | 25 | 27 | 29 | 29 | 33 | 36 | 34 |
| 125[4] | 36 | 39 | 38 | 40 | 43 | 42 | 48 | 50 | 50 |
| 125[3] | 35 | 37 | 38 | 40 | 43 | 43 | 48 | 52 | 51 |
| 750[4] | 35 | 38 | 38 | 39 | 44 | 43 | 46 | 50 | 50 |
| 750[3] | 36 | 38 | 39 | 42 | 44 | 44 | 50 | 52 | 52 |

[1] continuous discharge
[2] discharge ¼ hour a day
[3] discharge 4 hours a day
[4] discharge 2 hours a day
Test Lot No. 1 = 0.032g CMC
2 = 0.032g MOC
3 = 0.018g MOC + 0.009g CMC
MOC = methyl cellulose, type Methocel A4M Premium Dow Chemical Co. Midland, Michigan

TABLE II

| Voltage Cutoff (volt) | *SERVICE (HOURS) | | |
|---|---|---|---|
| | Test Lot 1 | Test Lot 2 | Test Lot 3 |
| 1.3 | 220 | 220 | 220 |
| 1.2 | 320 | 360 | 360 |
| 1.1 | 340 | 440 | 440 |
| 1.0 | Shorted | 500 | 500 |
| 0.9 | | 600 | 600 |
| 0.8 | | 640 | 640 |
| 0.7 | | 660 | 660 |

*Continuous discharge across 1500-ohm load
Test Lot No: 1 = 0.032g CMC
2 = 0.032g MOC
3 = 0.018g MOC + 0.009g CMC

TABLE III

| | Storage 54° C. | | | | | | Storage 71° C. | | | | | |
|---|---|---|---|---|---|---|---|---|---|---|---|---|
| | Test Lot 1 | | Test Lot 2 | | Test Lot 3 | | Test Lot 1 | | Test Lot 2 | | Test Lot 3 | |
| Time | Volts | Amps | Volts | Amps* | Volts | Amps | Volts | Amps | Volts | Amps* | Volts | Amps |
| Fresh | 1.58 | 4.6 | 1.60 | 2.9 | 1.60 | 4.4 | 1.58 | 4.7 | 1.61 | 3.3 | 1.60 | 4.0 |
| 2 weeks | 1.52 | 4.0 | 1.57 | 2.5 | 1.56 | 4.0 | 1.49 | 3.0 | 1.54 | 1.8 | 1.52 | 2.9 |
| 4 weeks | 1.51 | 3.7 | 1.56 | 2.4 | 1.54 | 3.7 | 1.47 | 2.5 | 1.52 | 1.5 | 1.52 | 2.3 |
| 6 weeks | 1.50 | 3.4 | 1.55 | 2.0 | 1.53 | 3.2 | 1.44 | 2.2 | 1.51 | 1.3 | 1.51 | 2.1 |
| 8 weeks | 1.49 | 3.1 | 1.54 | 1.9 | 1.53 | 2.9 | 1.43 | 1.8 | 1.50 | 1.1 | 1.49 | 1.7 |
| 10 weeks | 1.49 | 2.9 | 1.54 | 1.8 | 1.53 | 2.7 | | | | | | |
| 12 weeks | 1.48 | 2.9 | 1.54 | 1.7 | 1.53 | 2.6 | | | | | | |

*possibly due to anode not swelling.
Test Lot No. 1 = 0.032g CMC
2 = 0.032g MOC
3 = 0.018g MOC + 0.009g CMC
Volts = open circuit voltage(volts)
Amps = amperes

EXAMPLE 2

Several test lots of cells (0.6 ampere-hour capacity) were produced as shown in Example 1 except that the amounts of methyl cellulose and carboxymethyl cellulose were each varied from 0 to 3.5 percent based on the weight of the anode while maintaining the total percentage of one or both of these additives at 3.5 percent based on the weight of the extruded anode. The cells were discharged across a 1500-ohm load and at different ampere-hour intervals a cell from each test lot was disassembled and visually inspected. The data so observed are shown in Table 4.

Again these data demonstrate that methyl cellulose can be substituted for some or all of the carboxymethyl cellulose gelling agent in a powder-gel anode to produce a gel anode that will not internally short under low drain conditions.

TABLE IV

| | | | Discharged across a 1500-ohm load | | | |
|---|---|---|---|---|---|---|
| Test Lot No. | *CMC (%) | *MOC (%) | 0.172 (Ah)** | 0.256 (Ah) | 0.335 (Ah) | Internal Shorting |
| 1 | 3.5 | — | ZnO through sep. | ZnO through sep. | ZnO through sep. | Yes at 0.256 Ah |
| 2 | 3.0 | 0.5 | Lg. amounts of ZnO under sep. little through sep. | Small amount through sep. | ZnO through sep. | Yes at 0.256 Ah |
| 3 | 2.5 | 1.0 | Lg. amount of ZnO under sep. little through sep. | Small amount through sep. | ZnO through sep. | No |
| 4 | 2.0 | 1.5 | Moderate amount ZnO under sep. None through sep. | Little amount through sep. | ZnO through sep. | " |
| 5 | 1.5 | 2.0 | Like lot 4 except slightly less ZnO seen | Little amount through sep. | Small amount ZnO under sep. None through sep. | " |
| 6 | 1.0 | 2.5 | Small amount under sep. None through sep. | Like lot 5 except smaller amount through sep. | Very little ZnO through sep. | " |
| 7 | 0.5 | 3.0 | Small amount under sep. None through sep. | Small amount under sep. None through sep. | Small amount under sep. None through sep. | " |
| 8 | — | 3.5 | Small amount under sep. None through sep. | Very small amount under sep. None through sep. | Small amount under sep. None through sep. | No | lg. = large
sep. = separator
* = based on weight of dry constituents of anode.
** = ampere-hour (Ah)

While the invention has been described in conjunction with specific embodiments, it is obvious that certain modifications may be made to the invention without deviating from the scope of the invention.

What is claimed:

1. An alkaline cell employing a cathode, an aqueous alkaline electrolyte solution and a powder-gel anode comprising a major portion of a consumable anodic material, a minor amount of methyl cellulose, a minor amount of carboxylmethyl cellulose and an aqueous alkaline electrolyte solution.

2. The alkaline cell of claim 1 wherein the consumable anodic material is zinc powder and the electrolyte solution is aqueous potassium hydroxide.

3. The alkaline cell of claim 1 wherein the methyl cellulose varies between about 1 and about 4.5 percent and the carboxymethyl cellulose varies between about 0.5 and about 2.5 percent based on the weight of the anode.

4. The alkaline cell of claim 3 wherein the methyl cellulose is about 2 percent and the carboxymethyl cellulose is about 1.5 percent based on the weight of the anode.

5. The alkaline cell of claim 3 wherein the consumable anodic material is zinc powder and the electrolyte solution is aqueous potassium hydroxide.

6. The alkaline cell of claim 1 wherein the cathode comprises manganese dioxide.

7. The alkaline cell of claim 6 wherein the electrolyte is an aqueous potassium hydroxide electrolyte.

8. The alkaline cell of claim 3 wherein the cathode comprises manganese dioxide.

* * * * *